(12) United States Patent
Markland et al.

(10) Patent No.: US 6,190,462 B1
(45) Date of Patent: Feb. 20, 2001

(54) METHOD FOR DEWATERING STARCH

(75) Inventors: Flave E. Markland, Atkins; David A. Dunn, Mount Vernon, both of IA (US)

(73) Assignee: Penford Corporation, Bellevue, WA (US)

( * ) Notice: Under 35 U.S.C. 154(b), the term of this patent shall be extended for 0 days.

(21) Appl. No.: 09/346,593

(22) Filed: Jul. 2, 1999

Related U.S. Application Data

(60) Provisional application No. 60/092,106, filed on Jul. 8, 1998.

(51) Int. Cl.$^7$ .......................... C08B 30/08; C09D 103/02
(52) U.S. Cl. ............................ 127/71; 127/65; 106/213.1
(58) Field of Search ...................... 127/65, 71; 106/213.1

(56) References Cited

U.S. PATENT DOCUMENTS

| | | | | |
|---|---|---|---|---|
| 5,536,326 | * | 7/1996 | Stocker | 127/67 |
| 5,776,535 | * | 7/1998 | Palardy | 426/618 |
| 5,840,850 | * | 11/1998 | Palardy | 530/374 |
| 5,843,238 | * | 12/1998 | Palardy | 127/65 |

OTHER PUBLICATIONS

CA PLUS 1984:409149, Przekwas et al, "Window–Cleaner", Aug. 31, 1982.*
CA PLUS 1984:553870, Sanyo–Kokusaku Pulp Co., "Particulate dioctyl sulfosuccinate . . . ", May 22, 1984.*
CA PLUS 1993:215372, Allgood et al, "Endoscopic surgical instrument cleaning . . . ", Aug. 31, 1982.*

* cited by examiner

*Primary Examiner*—David Brunsman
(74) *Attorney, Agent, or Firm*—Marshall, O'Toole, Gerstein, Murray & Borun.

(57) ABSTRACT

The present invention provides in a method of treating starch, comprising the steps of (1) contacting starch with water to form a slurry and (2) mechanically removing said water from said starch slurry; the improvement comprising incorporating a dewatering composition comprising a dioctyl sulfosuccinate salt and a water miscible polyol into said starch slurry in an amount effective to decrease the water content of the resulting starch cake upon conclusion of the mechanical dewatering step.

10 Claims, No Drawings

METHOD FOR DEWATERING STARCH

This application claims priority on provisional patent application Ser. No. 60/092,106 filed Jul. 8, 1998.

BACKGROUND OF THE INVENTION

The present invention relates generally to methods of processing starch which include steps of adding water to starch to form starch slurries. More specifically the invention relates to improvements in the mechanical dewatering of starch slurries. During the manufacture of modified starches derived from various natural sources such as corn, wheat, rice, tapioca, and the like various processes are carried out to remove the starch in its native form from the plant seed or tuber.

The raw material for most starch production in the United States is dent corn where the starch is located in the floury endosperm as large round granules associated with a relatively small amount of protein. The starch granules from corn are removed during a process commonly referred to as wet milling. (A comprehensive description of corn wet-miffing can be found in *Principles of Cereal Science and Technology*, R. Carl Hoseney, pages 153–156, 1986.) During this process, the corn kernels are subjected to both mechanical and chemical forces that separate the various components found both on the exterior of and within the kernel. Shelled grain is prepared for milling in cleaners where air currents blow light chaff, and screens remove heavier pieces of foreign material. The cleaned corn is softened by soaking (steeping) for 30 to 50 hours in warm (50° C.) water acidified with sulfur dioxide to a pH of 3 to 4. The dilute sulfurous acid aids in the disintegration of the protein matrix so that starch and other components can be separated more easily. During steeping, the water content of the grain increases to 45%. The softened kernels are separated from the steepwater and then coarsely ground with water in degerminating or attrition mills. The lighter germ floats to the surface where it is removed from the other particles in flotation troughs or by hydroclone separators in which germ passes out in the overflow and the remaining mixture of starch, gluten and hulls pass out in the underflow.

The starch containing mixture is ground in a mill to separate the starch and gluten from the hulls. The starch and gluten are then separated from each other by means such as centrifugation. After separation from the gluten the starch is filtered by means such as screening and is typically washed or passed through a hydroclone. The starch that has been removed is washed and screened to remove undesirable material from reaching the next stage of manufacture. This aqueous starch slurry is then introduced into several process streams where various chemical modifications take place, causing many changes to the physical properties of the resulting granules. At this point the starch slurry is typically subjected to drying by a combination of mechanical and thermal steps.

Drying the suspended starch slurry after chemical modification involves reducing the approximately 20 gallons of water per 100 pounds of corn that has been added during the wet-milling process. This water must be removed before the product is packaged and marketed. The present invention relates to methods which help facilitate the removal of residual water from the starch slurry, thus allowing the manufacturing process to operate in a more efficient manner and allowing the starch product to be further dried, packaged and shipped for use in an industrial setting. The starch slurry is first mechanically dried in a dewatering step using means such as a plate or frame filter, centrifuge, drum dryer or most preferably a vacuum drum filter. The mechanical dewatering step typically produces a starch cake having a moisture content in the range of from 40 to 50 percent by weight. This leaves essentially two components remaining, a starch wet-cake and the water that was removed from the slurry, commonly referred to as filtrate. The wet-cake moisture content is the critical measurement regarding the efficacy of the dewatering step. The starch cake is then thermally dried, for example, in a tunnel or flash dryer.

It is desired to reduce the quantity of moisture present in the starch to promote safety, ease of handling and transfer as well as to reduce potential microbiological growth. In addition it is generally desired that as much water as possible be removed during the mechanical dewatering step in order to minimize energy consumption and maximize productivity (throughput) during subsequent thermal drying. Because of the large capital investment represented by thermal dryers for starch processing numerous efforts have been made to increase their throughput. Such efforts to improve the throughput of starch thermal dryers have been limited, however, by the tendency of drying starch to partly gelatinize when subjected to intense heating conditions. As dryer temperature and speeds are increased to gain output, more of this partial gelatinization occurs. In the art, the resulting dry starch is referred to as "horny" because of the very hard surface that is thus obtained. This partially gelatinized starch does not readily reslurry when the starch is used. A partially gelatinize starch becomes viscous and difficult to reslurry, with resulting difficulty in increasing solids content during processing. Moreover, when cooked, the partially gelatinized starch does not cook out properly and end use properties such as strength in a starch coated paper are adversely affected. These problems of partial gelatinization are even more significant when the starch in question is a substituted starch because such starches have an even greater tendency than normal to gelatinize upon heating. There is thus a desire in the art for methods to improve starch dryer throughput while avoiding partial gelatinization of starch and providing improvements in the quality of resulting starch products.

Surface active agents, or "surfactants" are widely used in industrial processes to decrease the surface tension of water and aqueous dispersions. Surfactants are generally divided into three classes: emulsifiers, wetting agents, and detergents. All surfactant types are similar in that they have their effect at the surfaces of materials in solution. Emulsifiers keep aqueous, immiscible compounds in suspension by coating the suspended phase and decreasing surface tension of the dispersing phase at the interface. Detergents are emulsifiers that affect water/oil interfaces to bring oily, solid materials into solution. Wetting agents allow the dispersion of water onto or into other materials by decreasing surface tension, thus increasing flowability. While surfactants are generally used to maintain the physical integrity of dispersions, they can also be used to create differences between dispersion components. A common system for using surfactants to separate dispersion components is industrial waste water purification, notably waste sludge water removal.

Surfactants used in waste sludge water removal are usually oil based and act as emulsifiers in that the surfactant surrounds the solid particle with an oily film which repels water and thus promotes the separation of sludge from the treated water. This method results in an oily residue on the solid particle after the water has been removed. In the case of processing waste sludge, this presence of surfactant residue on the filtered solids is preferred because it is the sludge which is disposed of thus minimizing the presence of surfactant residue in the separated waste water which is typically subjected to later purification steps. Nevertheless, the use of oil based surfactants such as are used in waste sludge processing can present problems in continuously operating aqueous systems where water is the primary medium and very little oily material is present. If the surfactant is not miscible in the water phase, problems in processing equipment can occur and have detrimental effects on the resulting product. Processing problems are compounded if the product is processed requiring elevated dosages of surfactant to be effective.

Surfactants have been used in starch processing on a limited basis. Specifically, surfactants have been used at low concentrations, i.e. less than 200 ppm as antifoams in starch processing. In addition, U.S. Pat. No. 5,536,326 discloses the use of a particular surfactant composition comprising polybutene and at least one surfactant having a melting point less than 20° C. which enhances the removal of water from starch when used at concentrations of from about 100 to 500 parts per million (ppm). Nevertheless, there remains a desire in the art for improved methods and compositions to enhance dewatering of starch. In particular, there remains a desire in the art for dewatering compositions and methods wherein the dewatered starch remains substantially free of the surfactant and other compositions used in the dewatering process.

SUMMARY OF THE INVENTION

The present invention relates to the discovery that the incorporation of the preferred starch dewatering compositions of the invention into a starch slurry prior to mechanical dewatering can surprisingly result in reduction of moisture content and increases in solids levels obtained during mechanical dewatering of a starch slurry wherein the dewatered starch remains substantially free of the dewatering composition. Specifically, the invention provides an improvement in methods of treating starch comprising the steps of (1) contacting starch with water to form a slurry and (2) mechanically removing said water from said starch slurry wherein the improvement comprises incorporating a starch dewatering composition comprising a dioctyl sulfosuccinate salt and a water miscible polyol into the starch slurry in an amount effective to decrease the water content of the resulting starch upon conclusion of the mechanical dewatering step. The dioctyl sulfosuccinate salt is preferably a sodium salt which is known and is commercially available as "DOSS" (CAS-577-11-7) although it is contemplated that salts comprising other cations such as potassium may also be used in practice of the invention.

Water miscible polyols which are useful according to the invention include lower alcohols and lower glycols with preferred water miscible polyols being selected from the group consisting of methanol, ethanol, isopropanol, ethylene glycol and propylene glycol and with ethanol and propylene glycol being particularly preferred. The water miscible polyols function to solubilize the dioctyl sulfosuccinate salt which is generally characterized by poor solubility in water. While those of skill in the art can readily determine the appropriate ratio of polyol to dioctyl sulfosuccinate salt for given temperature and concentration conditions it is generally preferred that the dewatering composition comprise 60–80% dioctyl sulfosuccinate salt to 20–40% polyol by weight. A particularly preferred dewatering composition according to the invention comprises 70–75% by weight dioctyl sulfosuccinate sodium salt (DOSS) and 7–13% by weight ethanol with the remainder of the formulation comprising polyphosphates, silicate salts and water. In addition to functioning to solubilize the dioctyl sulfosuccinate salt, the polyols may further function as drying agents to assist in the evaporative drying of the dewatered starch.

The dewatering compositions of the invention may be incorporated into the starch slurries at concentrations of about 100 ppm on a starch dry solids basis and greater. While the dewatering compositions may be used at levels of 1000 ppm to 2000 ppm and more there exist diminishing economic returns when the compositions are used at the higher levels. Moreover, some of the components of the dewatering compositions may tend to be less soluble or miscible at the higher concentrations in starch. In general, the dewatering compositions should be incorporated at concentrations greater than about 100 ppm because use at lower levels may be inadequate to provide the desired dewatering effect. Preferred ranges for use of the dewatering compositions of the invention range from 500 to 1200 ppm with 900 to 1200 ppm being more preferred and 1000 ppm being most preferred. Nevertheless, those of skill in the art will be able to readily determine appropriate concentrations for incorporation according to the particular circumstances of their use.

According to a further preferred aspect of the invention, the dewatering composition may optionally further comprise a water miscible nonionic surfactant such as those selected from the group consisting of sodium or potassium salts of oleate, dodecyl benzenesulfonate, fatty alcohol sulfate and alkylbenzene sulfonate salts which may be incorporated into the starch slurry at various concentrations with concentrations of up to 2000 ppm and higher in the starch slurry with concentrations of from 500 ppm to 1200 ppm in the starch slurry being preferred.

The reduction of water content in the mechanically dewatered starch provides advantages of reducing energy consumption and increasing throughput and efficiency during subsequent thermal drying. The invention thus provides methods to improve starch dryer throughput while avoiding partial gelatinization of starch and providing a higher quality starch product by reducing the water content and raising the degree of solids in mechanically dewatered starch prior to its being subjected to thermal drying. In addition, the reduction of water content in the starch cake subjected to thermal drying provides improvements in the quality of thermally dried starches by reducing the intensity of such drying and the tendency of starches to partially gelatinize during thermal drying.

The methods of the invention are useful for improving the starch dewatering efficiency in any mechanical dewatering apparatus including frame and plate filters, centrifuges, drum dryers and vacuum drum filters but are particularly useful when used in conjunction with vacuum filters generally and rotary vacuum filters in particular.

DETAILED DESCRIPTION OF THE INVENTION

The present invention provides an improvement in methods of treating starch comprising the steps of (1) contacting starch with water to form a slurry and (2) mechanically removing said water from said starch slurry; the improvement comprising incorporating a dewatering composition comprising a dioctyl sulfosuccinate salt and a water miscible polyol into the starch slurry in an amount effective to decrease the water content of the resulting starch upon conclusion of the mechanical dewatering step. The method of the invention is particularly useful in achieving dewatering of a starch slurry wherein the dewatered starch remains substantially free of the dewatering composition. In particular, analysis of the filtrate shows that for a 1000–2000 ppm dose containing about 75% DOSS and the remainder ethanol, approximately 80–85% of the DOSS is retained in the filtrate as determined by U.S. Environmental Protection Agency Method 5540C. Thus, by substantially free of dewatering composition is meant less than about 20% of the dewatering composition incorporated into the starch slurry being present in the dewatered slurry.

The present invention provides improvements in processing of starches generally, and particularly with respect to substituted starches. Whenever starch is dried by heating there is a danger of partially gelatinizing starch particles by subjecting them to intense heating. This is particularly the case with substituted starches which gelatinize more readily than unsubstituted or non-hydrolyzed starches. Use of the improved method of the invention thus reduces partial gelatinization resulting in "horny" starch.

According to typical methods of starch processing to which the invention applies, a starch slurry is pumped from a slurry storage tank, across cleaning screens and to a washing centrifuge supply tank. From there, the starch is washed at the washing centrifuge and flows to the dewatering apparatus supply tank such as a vacuum filter supply tank. From the dewatering apparatus supply tank, the slurry passes through a heat exchanger to heat it to process temperature and is introduced to the dewatering apparatus. In the case of a vacuum filter, the starch slurry is passed into the vacuum filter tub.

The starch dewatering composition may be placed into the slurry stem at any point prior to the mechanical dewatering step. When the mechanical dewatering system is a vacuum drum filter the dewatering composition is preferably added to the slurry at any point between and including the slurry storage tank and the vacuum filter tub but is most preferably added to the vacuum filter tub. The dewatering composition is preferably added at a rate of from about 500 ppm to 1500 ppm on a dry starch ratio with resulting concentrations of about 1000 ppm being preferred.

When utilizing the dewatering composition according to the invention, one of ordinary skill in the art would recognize that various drying parameters could be adjusted to optimize the drying process. Specifically, items that could be controlled to allow for pickup and drying optimization during the mechanical dewatering step include slurry temperature, slurry pH, vacuum filter tub level, vacuum filter drum speed and slurry baume (solids). Downstream of the mechanical dewatering step, various modifications can also be made in the thermal drying step to optimize its performance. Specifically, air balance, temperatures and product flow can each be altered according to the skill in the art in order to optimize overall drying performance.

In a typical vacuum filter dewatering operation processing conditions would preferably be altered as follows. While the temperature of the slurry feeding into a vacuum filter would typically range from 80 to 125° F. without the dewatering composition of the invention, those temperatures would preferably be raised to a range of from 85 to 130° F. (most preferably about 105° F.) when the slurry comprises the dewatering composition according to the invention. Slurry pH preferably ranges from 4 to 9 during drying and does not need to be altered when using the dewatering composition according to the improved method of the invention. Vacuum filter tub level typically ranges from 75% to 100% when dewatering without the use of the dewatering composition but is preferably maintained at a level of from 85% to 100% (most preferably 95%) when using the dewatering composition. Vacuum filter drum speed is typically set between 0.28 and 0.50 RPM without the use of the dewatering composition but is preferably increased to between 0.33 to 0.66 RPM (most preferably about 0.44 RPM) when using the dewatering composition according to the invention. Slurry Baume (solids content) which is typically maintained at from 9 to 12 Be' in the absence of the dewatering composition may be increased to from 10 to 16 Be' (preferably 11 to 12 Be') when using the dewatering composition according to the invention.

Other aspects and advantages of the present invention will be understood upon consideration of the following illustrative examples of practice of the invention.

EXAMPLE 1

According to this example, a starch dewatering composition was prepared comprising 73% dioctyl sulfosuccinate sodium salt and 12% ethanol with the remainder comprising inert ingredients including polyphosphates, silicate salts and water (hereafter, "Composition A"). The starch dewatering composition was then incorporated into a starch slurry at a concentration of about 1000 parts per million (ppm) on a dry solids basis into an aqueous starch slurry with starch solids of about 60% by weight. The slurry sample was then vacuum filtered using a Buchner Funnel with coarse-grade filter paper over a fixed time and the resultant wet cake was analyzed for moisture using various means. The wet cake moisture without Composition A was approximately 40.2% +/−0.2% and with addition of 1000 ppm of Composition A, the wet cake moisture was 28.3% +/−0.2%, for a decrease in wet-cake moisture of 30% by weight.

EXAMPLE 2

According to this example, the method of Example 1 was carried out with the same starch slurry type and amounts of Composition A using a pilot-scale drum filter similar to that used in a full-scale manufacturing setting. A starch slurry sample without any Composition A had wet cake moisture of 44.55 % +/−0.2%. Addition of about 1000 ppm composition A on a dry solids basis had wet cake moisture of 33.77% +/−0.2%.

EXAMPLE 3

According to this example, various starch slurry filtrate mixtures retained after the slurry was vacuum-filtered were measured using a Fisher Surface Tensiometer. Surface tension is a property describing the amount of energy needed to disrupt the surface layer of a liquid. The higher the dynes/cm reading, the more energy that is necessary to disrupt the surface of the liquid, which may, in turn, necessitate the use of more energy to remove the residual moisture from the starch slurry.

| Sample | Dynes/cm |
| --- | --- |
| Tap Water | 77.1 |
| 1000 ppm Comp A Tap | 32.7 |
| Blank Filtrate #1 | 60.1 |
| Blank Filtrate #2 | 61.8 |
| Spike #1 500 ppm Comp A | 39.6 |
| Spike #2 500 ppm Comp A | 39.4 |
| Spike #3 1000 ppm Comp A | 33.4 |

A sample containing only water with nothing added had the highest surface tension, while the blank filtrate samples, which contained soluble starch fractions and various by-products of the manufacturing process, had intermediate surface tension values. The addition of the Composition A dewatering composition to the starch slurry at various concentrations resulted in the filtrate material having a lower surface tension measurement than the blank slurry filtrate samples. This example shows that the Composition A was largely retained in the filtrate as evident in the measurements above.

While this invention has been described with respect to the above details, it is apparent to those skilled in the art that other modifications and compositions similar in form should have similar results in dewatering starches. Accordingly, only such limitations as appear in the appended claims should be appended thereon.

What is claimed is:

1. In a method of treating starch, comprising the steps of (1) contacting starch with water to form a slurry and (2) mechanically removing said water from said starch slurry;

the improvement comprising incorporating a dewatering composition comprising a dioctyl sulfosuccinate salt and a water miscible alcohol into said staph slurry in an amount effective to decrease the water content of the resulting starch cake upon conclusion of the mechanical dewatering step.

2. The method of claim 1 wherein the water miscible alcohol is selected from the group consisting of lower alcohols and lower glycols.

3. The method of claim 2 wherein the water miscible alcohol is selected from the group consisting of methanol, ethanol, isopropanol, ethylene glycol and propylene glycol.

4. The method of claim 3 wherein the miscible alcohol is ethanol.

5. The method of claim 1 wherein the dewatering composition is incorporated into said starch slurry at a concentration between 100 to 2000 parts per million (ppm) of said composition by weight on a starch dry solids basis.

6. The method of claim 5 wherein the dewatering composition is incorporated into said starch slurry at a concentration between 700 and 1200 ppm.

7. The method of claim 1 wherein the dioctyl sulfosuccinate salt is a sodium salt.

8. The method of claim 1 wherein the dewatering composition further comprises an anionic surfactant.

9. The method of claim 8 wherein said ionic surfactant is selected from the group consisting of sodium oleate, dodecyl benzenesulfonate, fatty alcohol sulfate and alkyl benzene sulfonate salts.

10. The method of claim 1 wherein water is removed from said slurry by a mechanical dewatering apparatus selected from the group consisting of centrifuges, drum dryers and vacuum drum filters.

* * * * *

UNITED STATES PATENT AND TRADEMARK OFFICE
CERTIFICATE OF CORRECTION

PATENT NO. : 6,190,462 B1  
DATED : February 20, 2001  
INVENTOR(S) : Markland et al.

Page 1 of 1

It is certified that error appears in the above-identified patent and that said Letters Patent is hereby corrected as shown below:

<u>Column 7,</u>  
Line 22, "staph" should be -- starch --.

Signed and Sealed this

Sixteenth Day of October, 2001

Attest:

*Nicholas P. Godici*

NICHOLAS P. GODICI  
*Attesting Officer*     *Acting Director of the United States Patent and Trademark Office*